United States Patent
Martin

(10) Patent No.: US 11,352,187 B2
(45) Date of Patent: *Jun. 7, 2022

(54) REUSABLE INFLATABLE PACKAGING DEVICE

(71) Applicant: Airbox Packaging LLC, New York, NY (US)

(72) Inventor: Daniel Martin, Stewartsville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,029

(22) Filed: Dec. 16, 2020

(65) Prior Publication Data

US 2021/0171263 A1    Jun. 10, 2021

Related U.S. Application Data

(63) Continuation-in-part of application No. 16/220,231, filed on Dec. 14, 2018, now Pat. No. 10,926,935.

(60) Provisional application No. 62/771,415, filed on Nov. 26, 2018.

(51) Int. Cl.
| | |
|---|---|
| *B65D 81/02* | (2006.01) |
| *B65D 81/05* | (2006.01) |
| *B65D 81/38* | (2006.01) |
| *B65D 65/42* | (2006.01) |

(52) U.S. Cl.
CPC ........... *B65D 81/052* (2013.01); *B65D 65/42* (2013.01); *B65D 81/3888* (2013.01)

(58) Field of Classification Search
CPC .. B65D 81/052; B65D 85/30; B65D 81/3888; B65D 65/42
USPC .............................. 206/522, 591–594; 383/3
See application file for complete search history.

(56) References Cited

U.S. PATENT DOCUMENTS

| | | | | |
|---|---|---|---|---|
| 4,573,202 | A | * | 2/1986 | Lee .......................... A45C 3/00 190/107 |
| 4,779,726 | A | | 10/1988 | Pratt |
| 4,949,530 | A | | 8/1990 | Pharo |
| 5,205,432 | A | | 4/1993 | Gullan |
| 5,272,856 | A | | 12/1993 | Pharo |
| 5,487,470 | A | | 1/1996 | Pharo |
| 5,570,788 | A | | 11/1996 | Batsford |
| 5,622,262 | A | | 4/1997 | Sadow |
| 5,624,035 | A | * | 4/1997 | Kim ..................... B65D 81/052 206/521 |
| 5,752,470 | A | * | 5/1998 | Koneke ................ A01K 1/0125 119/499 |
| 5,769,232 | A | * | 6/1998 | Cash .................... B65D 81/052 206/522 |
| 6,464,079 | B1 | | 10/2002 | Newman |
| 7,106,202 | B2 | | 9/2006 | Dickinson |
| 8,745,960 | B2 | | 6/2014 | Kannankeril et al. |
| 8,820,578 | B2 | | 9/2014 | Kneer et al. |

(Continued)

FOREIGN PATENT DOCUMENTS

| | | |
|---|---|---|
| EP | 0460942 A3 | 7/1992 |
| EP | 0779223 A1 | 6/1997 |

(Continued)

*Primary Examiner* — Luan K Bui
(74) *Attorney, Agent, or Firm* — Ted Sabety; Sabety +associates, PLLC

(57) ABSTRACT

A reusable packaging device that in a use state is a rhomboid outer structure with an internal inflatable and reusable vessel that surrounds and protects a payload, that can be converted into a storage state by deflating the vessel and folding the outer structure flat in order that it may be stacked.

41 Claims, 24 Drawing Sheets

(56) References Cited

U.S. PATENT DOCUMENTS

| | | |
|---|---|---|
| 2003/0024846 A1 | 2/2003 | Nadler |
| 2003/0139271 A1 | 7/2003 | Vangedal-Nielsen et al. |
| 2005/0006271 A1 | 1/2005 | Nakagawa |
| 2008/0237321 A1* | 10/2008 | Chen ................. B65D 15/22 |
| | | 229/117.05 |
| 2011/0011857 A1 | 1/2011 | Mele |
| 2014/0117072 A1* | 5/2014 | Cullen ............... B65D 11/1853 |
| | | 229/117.05 |
| 2014/0224699 A1* | 8/2014 | Smith ..................... B65B 5/06 |
| | | 206/522 |
| 2016/0039574 A1 | 2/2016 | Barlas |
| 2017/0015478 A1 | 1/2017 | Sebald et al. |
| 2017/0247164 A1 | 8/2017 | Zhang |

FOREIGN PATENT DOCUMENTS

| | | |
|---|---|---|
| EP | 2517977 B1 | 10/2015 |
| EP | 3095721 A1 | 11/2016 |
| EP | 3260392 A1 | 12/2017 |
| WO | 009320 | 8/1990 |
| WO | 2014147425 A3 | 11/2014 |

\* cited by examiner

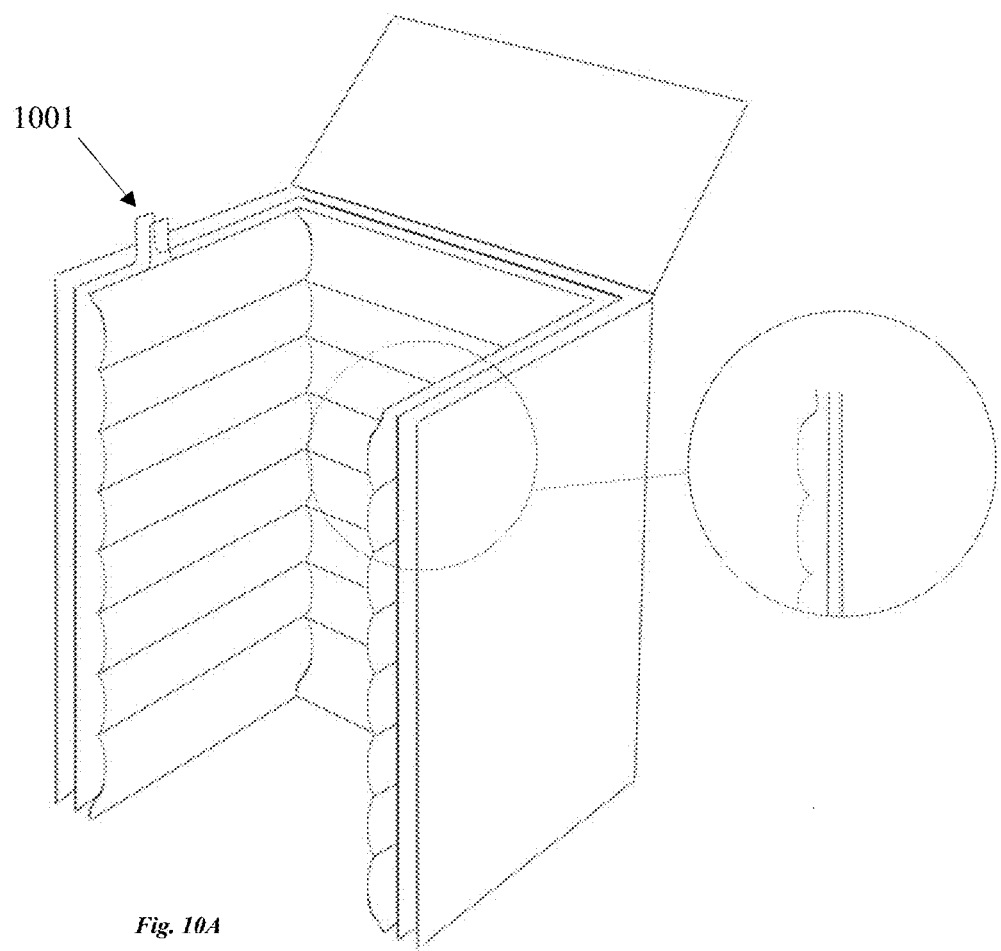
*Fig. 10A*
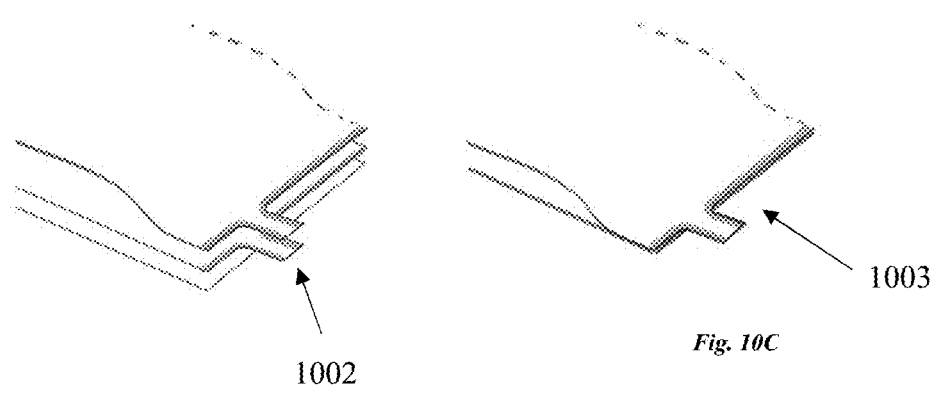
*Fig. 10B*
*Fig. 10C*

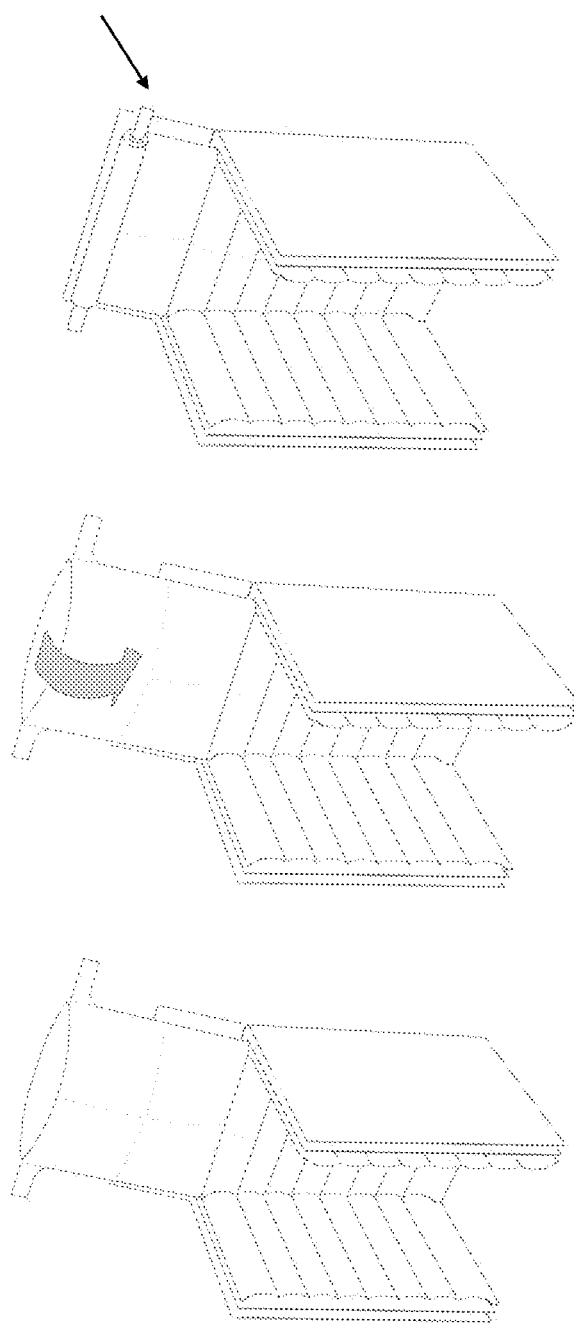
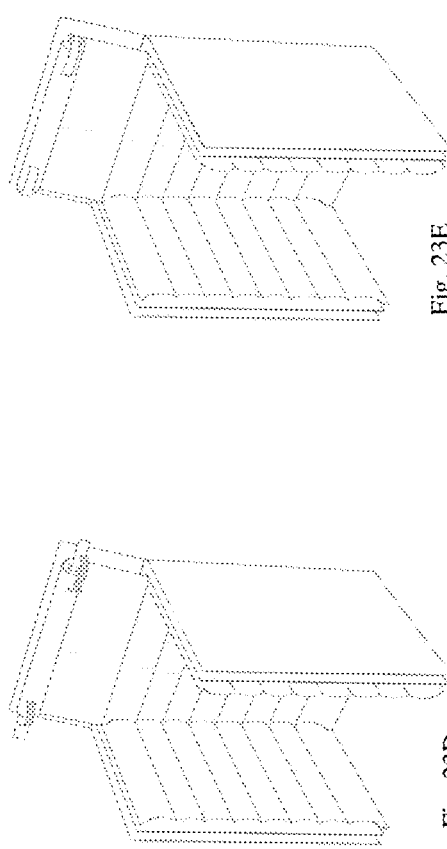
Fig. 23A
Fig. 23B
Fig. 23C
Fig. 23D
Fig. 23E

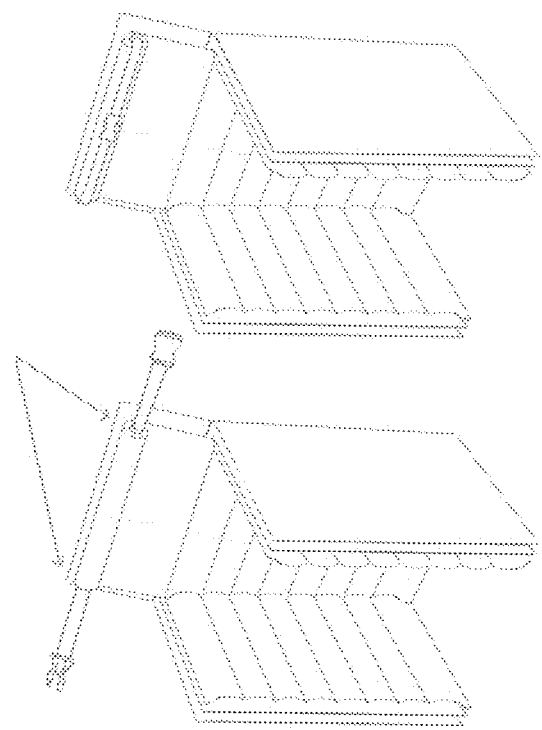
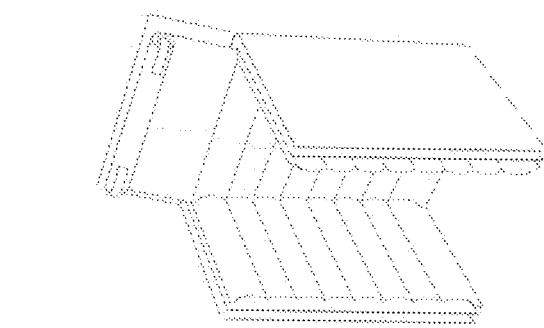
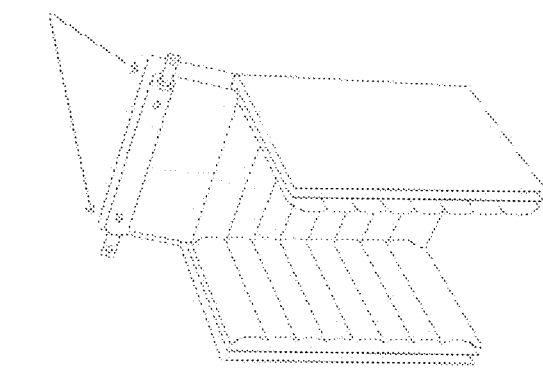
Fig. 24A  Fig. 24B  Fig. 24C  Fig. 24D

REUSABLE INFLATABLE PACKAGING DEVICE

PRIORITY CLAIM

This is a utility application that is a continuation-in-part of U.S. patent application Ser. No. 16/220,231, filed on Dec. 14, 2018 which claims the benefit of U.S. Prov. Pat. App. No. 62/771,415 filed on Nov. 26, 2018, all of which are incorporated by reference in their entireties herein for all that they teach.

FIELD OF INVENTION

This invention relates to devices used to package or encase merchandise for shipment to customers.

BACKGROUND

The rise of the Internet has increased the practice of buying and selling goods remotely, where selection and purchase of goods may be done on-line. This commercial activity has been growing at an exponential rate. In order to ship merchandise purchased on-line, the shipper typically houses the merchandise in a corrugate box filled with some kind of shock absorbing filler. The popularity of ecommerce is a direct cause of skyrocketing use of corrugate boxes. This is an ecological problem.

One third of the average landfill dump is packaging material. 69 Million tons of paper and paperboard are used each year. Materials recycling is only of limited value. While it is true that cardboard and corrugate boxes are recyclable, the fibers are only usable 11 times before the fibers are too weak to use. In any case, recycling of boxes places a burden on consumers: they have to break down and store the boxes in order to place them out for pickup by local recycling services. The reaction is often not to recycle at all. The current packaging experience holds its fair share of frustrations. Once you receive a package, especially a large one or one carrying fragile items, there is a mountain of "stuff" that the user needs to get rid of. Including but not limited to; styrofoam, packaging peanuts, packaging airbags, internal corrugate pieces and finally the entire corrugate box itself. The current packaging experience is both frustrating for the consumer, as well as environmentally damaging. Therefore, there is a need for a foldable, collapsible, stackable packaging system that the user could compress down to something flat and mail back to the sender for immediate reuse.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

FIG. 10 is a model of the claimed invention (FIG. 10A) depicting the outer layer and valve (FIG. 10B) formed from the heat sealing of the two inner layers (FIG. 10C).

FIG. 23 is a model of the claimed invention (FIG. 23A, FIG. 24B) depicting rolling the air bladder (FIG. 23C, FIG. 23D, FIG. 23E)

FIG. 24 is model of the claimed invention depicting securing the rolled portion by snaps (FIG. 24A, FIG. 24B) or by buckles (FIG. 24C, FIG. 24D).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
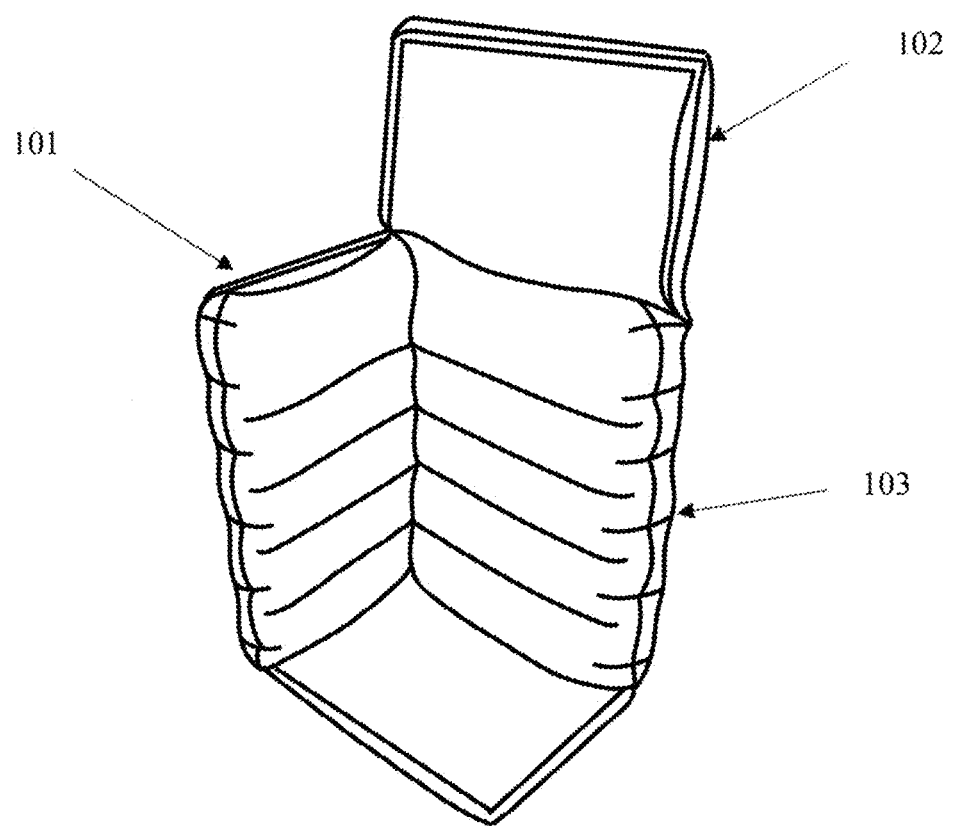
FIG. 1 is a cutaway view of the interior of the packaging system
Figure 8:
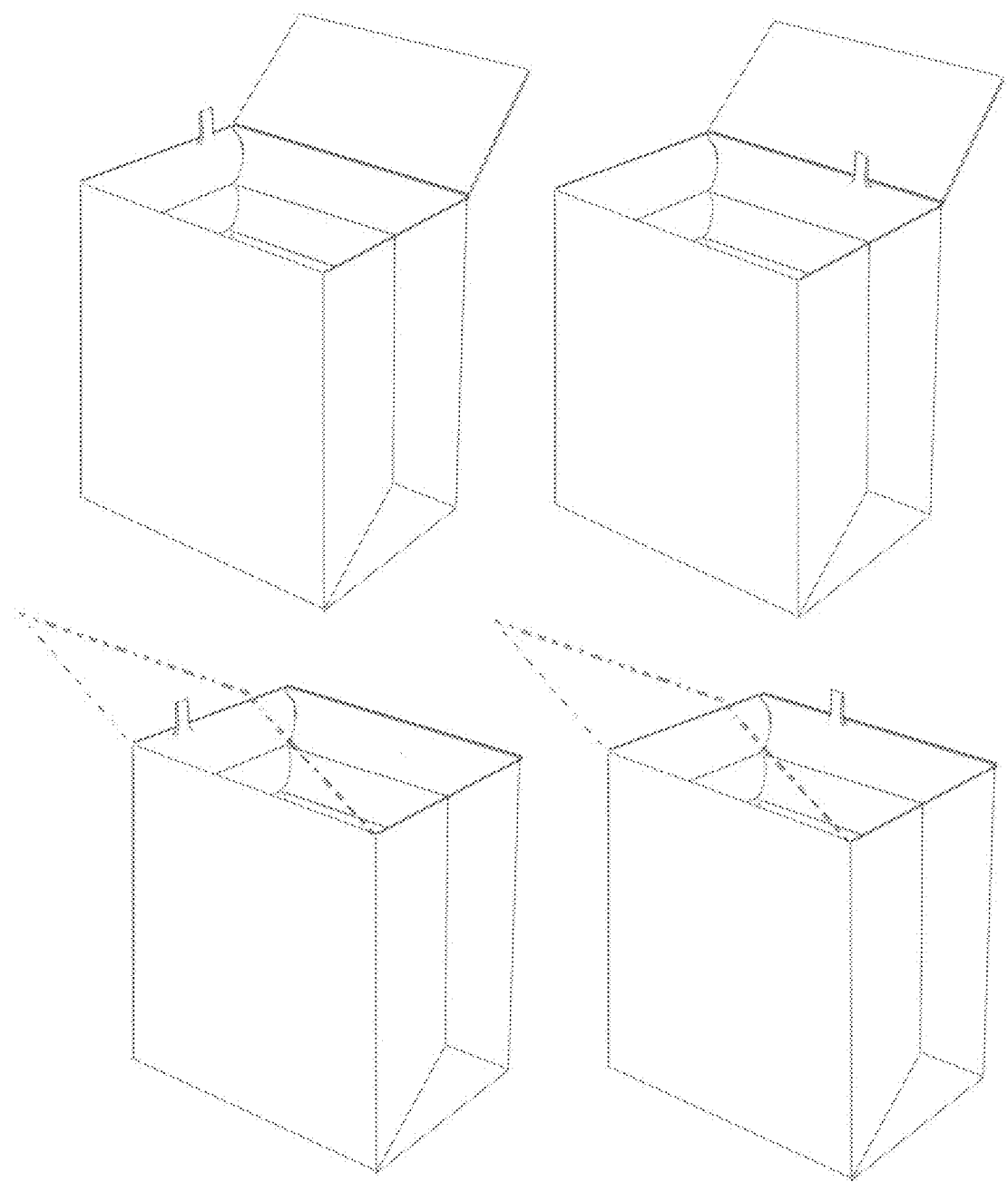
FIG. 8 is a drawing showing the claimed invention according to four different exploded or expanded perspectives

The inflatable packaging is comprised of three layers, an outer layer (102), and one or more inner layers (103) that form an inflatable vessel or bladder. See FIG. 1. The interior vessel can include a metal coated film, aluminum coated mylar and/or may be covered by a fourth, protective, textile layer. In the preferred embodiment, the inner two layers are comprised of Mylar. When inflated, the inflated vessel stiffens the walls of the outer layer and provide structural support. The outer layer (101) material is made of a sufficiently flexible material that becomes rigid in combination when the vessel is inflated. In one embodiment, outer layer is formed from a layer of material that forms a rhomboid, with a bottom, four sides and a top. (FIG. 8). The outer layer and vessel layers are formed from flat pieces that are substantially the same dimensions that fold in the same way to form a rhomboid shape. The vessel layers are an inflatable device that in one embodiment encircles the interior proximate to the four sides of the rhomboid. In other embodiments, the vessel can be formed to be further proximate to the bottom or top (102) (or both) of the rhomboid.

Figures 5A, 5B:
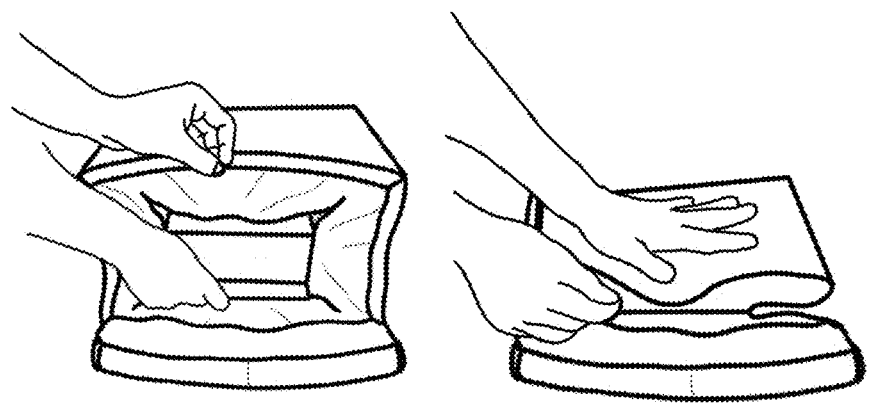
FIG. 5 depicts the claimed invention in its relaxed, non-inflated state, where the user removes the package (FIG. 5A), deflates the package (FIG. 5B) and replaces the shipping label (FIG. 5C, FIG. 5D) with a return receipt (FIG. 5E)
Figures 5C, 5D, 5E:
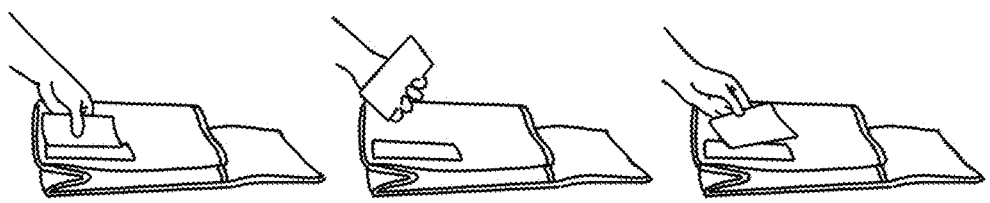
Figure 6:
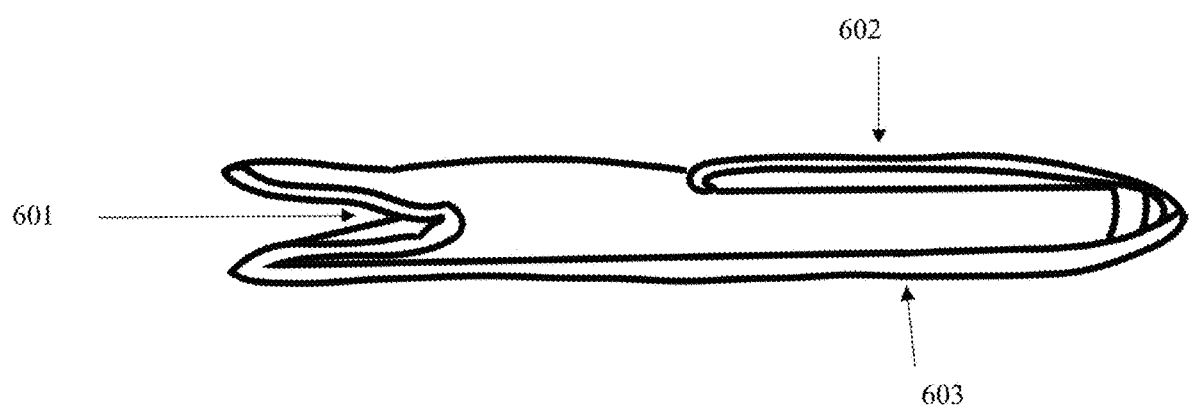
FIG. 6 shows how the claimed invention is deflated and folded for further use, and further depicts the crease at the bottom of the packaging system
Figure 7A:
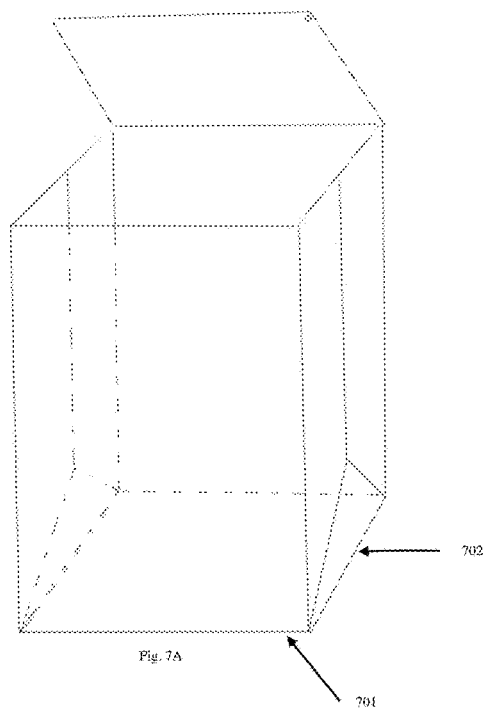
FIG. 7 depicts an alternative folding pattern that is inflated (FIG. 7A) and the steps of deflating (FIG. 7B), or collapsing (FIG. 7C), and folding (FIG. 7C, FIG. 7D) the claimed invention
Figure 7B:
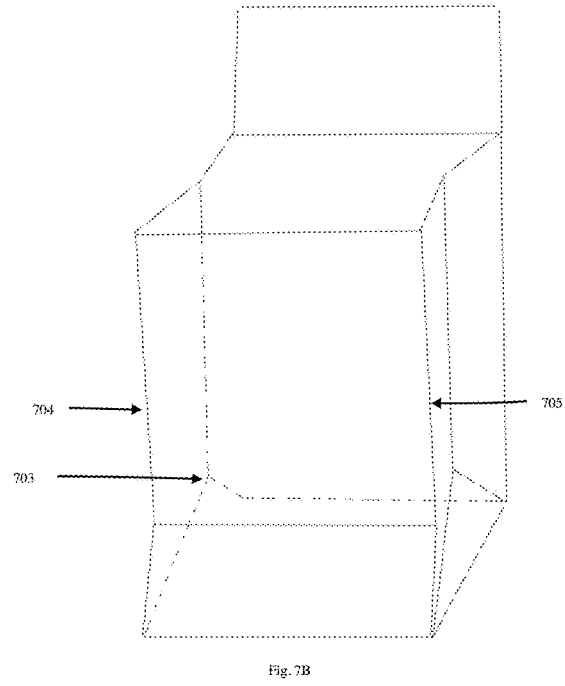
Figure 7C:
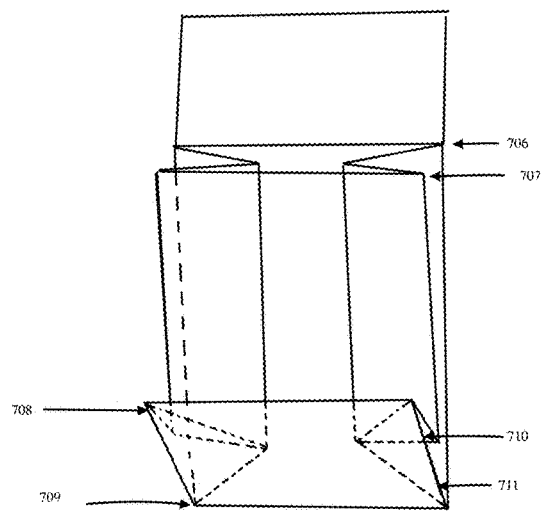
Figure 7D:
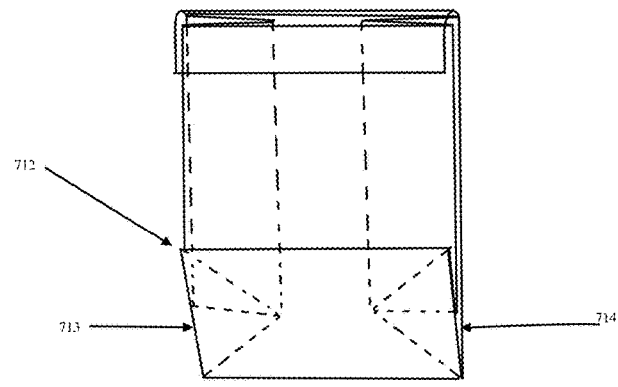

The package is configured to be usable in two states. In a first state, the vessel is deflated and the bottom (701) and two sides (704, 705) of the rhomboid are each folded in on themselves with at least a bifold (601; 704), in order that packaging device lay substantially flat, with the top laying over one of the sides. (FIG. 6, 602). The folded configuration is flat, with the lid of the package folded over, and the bottom and two sides folded on itself at the center of each panel (603) in order that the device to be substantially flat and stackable. In the second state, the vessel is inflated, and the bottom and two sides of the rhomboid unfolded. In this state, the packaging device is ready to receive a payload that is placed in its interior region. The vessel is further inflated until the vessel presses against the payload. The top may then be closed and fastened. The outer layer preferably has a transparent pouch attached to its exterior into which shipping labels may be inserted. (FIG. 5). In a non-inflated state, the user removes the package (FIG. 5A), deflates the package (FIG. 5B) and replaces the shipping label (FIG. 5C, FIG. 5D) with a return receipt (FIG. 5E)

The outer layer top is attached along a first edge to a corresponding top edge of one side of the rhomboid, such that the top may be open and closed using that first edge as a hinge. (102) A fastener may be attached along the opposing edge from the first edge, for example a first side of a zipper seam may be attached along the opposing edge and the second side of the zipper seam may be sewn along the corresponding top edge of the opposite side of the rhomboid from the side that attaches the hinging first edge. In other embodiments, one side of a zipper seam may be sewn along three edges of the top of the rhomboid, with mating side sewn along the corresponding three edges at the top of three sides of the rhomboid. The rhomboid itself may be a cube.

The material comprising the outer layer is selected of a sufficiently stiff material that resists penetration by corners of other boxes, especially cardboard or corrugate box corners. In other embodiments, the outer layer material is selected to be resistant to needle penetration. In the preferred embodiment, the outer layer is a textile comprised of jute fibers. However, other embodiments include woven synthetic fibers. Both jute or synthetic fibers have high tenacity (breaking force), sound and heat insulation properties and low thermal conductivity. In the preferred embodiment, the outer layer is a jute textile, with synthetic fibers comprising a hem sewn along the edges of the jute textile piece that, when folded and sewn at the seams, forms the package. Materials that may be used as an outer layer include a stiff plastic, cardboard, corrugate, or a synthetic fiber textile. The material stiffness must be sufficient to protect from puncture. In one embodiment, the sufficient stiffness resists puncture by the corners of other boxes that may be sharing space in a truck or airplane. In other embodiments, the material is sufficiently stiff so as to resist puncture by needles. For example, an embodiment may have an outer layer that resists a needle puncture up to a piercing by a force between 2 and 10 Newtons by a 25 gauge needle penetrating perpendicular to the material.

Figure 12:
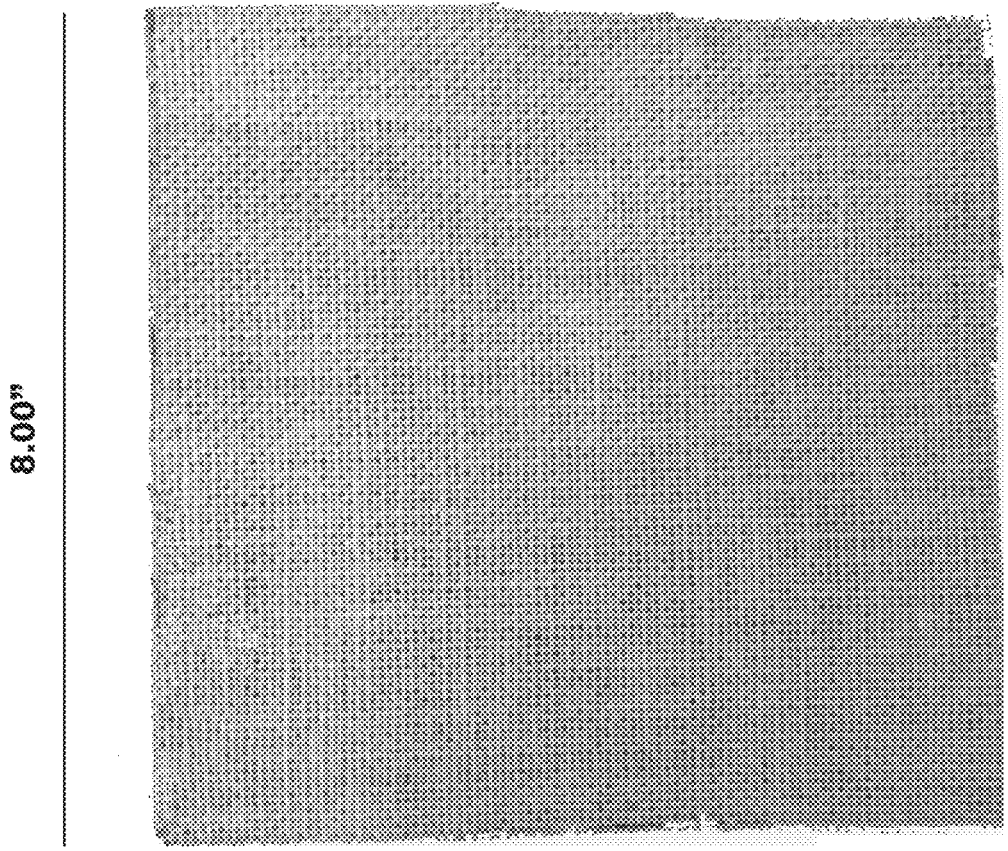
FIG. 12 is a depiction of an 8"×8" square piece of jute
Figure 13:
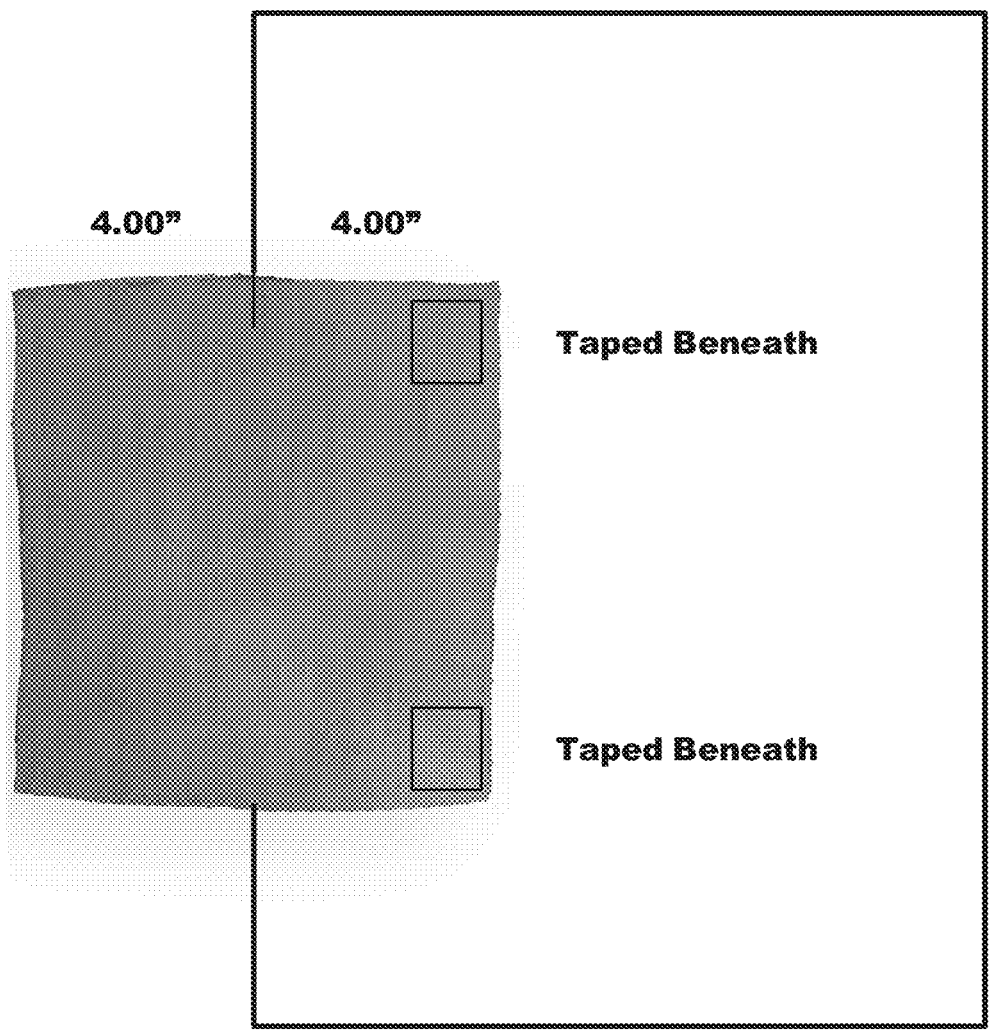
FIG. 13 is a depiction of the "stiffness test" as further set forth in the specification
Figure 14:
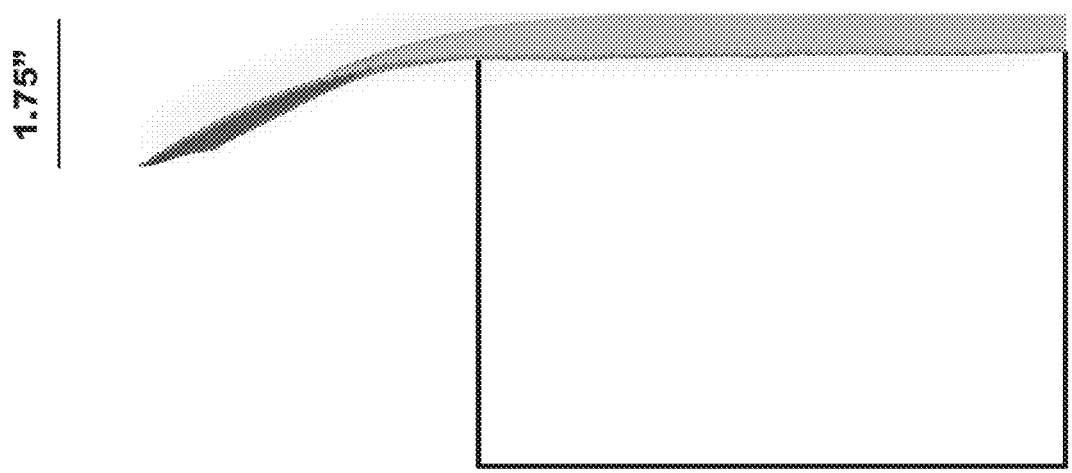
FIG. 14 shows is a further depiction of the "stiffness test" as further set forth in the specification

In order to determine whether the material is sufficiently stiff so that it resists penetration by corners of other boxes, the following test, as depicted in FIGS. 12-14, may be performed. An exemplary embodiment is explained in further detail as follows:
1) Placing an 8"×8" square piece of jute on the edge of a rigid wooden board. See FIG. 12, where the piece is placed such that exactly half of it is off the edge of the board −4" off the edge, and 4" still on the surface of the board. See FIG. 13.
2) The 4" half that remains on the wooden surface is held in place by two pieces of tape—one on each corner—between the jute and the wooden board. See FIG. 13.
3) The vertical distance between the edge of the jute furthest from the wooden board and the horizontal plane of the wooden board is measured, where in the preferred embodiment, the measurement is 1.75"; (See FIG. 14), resulting in a stiffness of about 44%, calculated by dividing the vertical distance of the edge that drops down because of gravity by the distance out from the edge of the test bench.
4) In alternative embodiments, this value for stiffness may range from around 33% to around 73%.
5) In yet another embodiment, for some applications this value of stiffness is greater than 73%.

Figure 15:
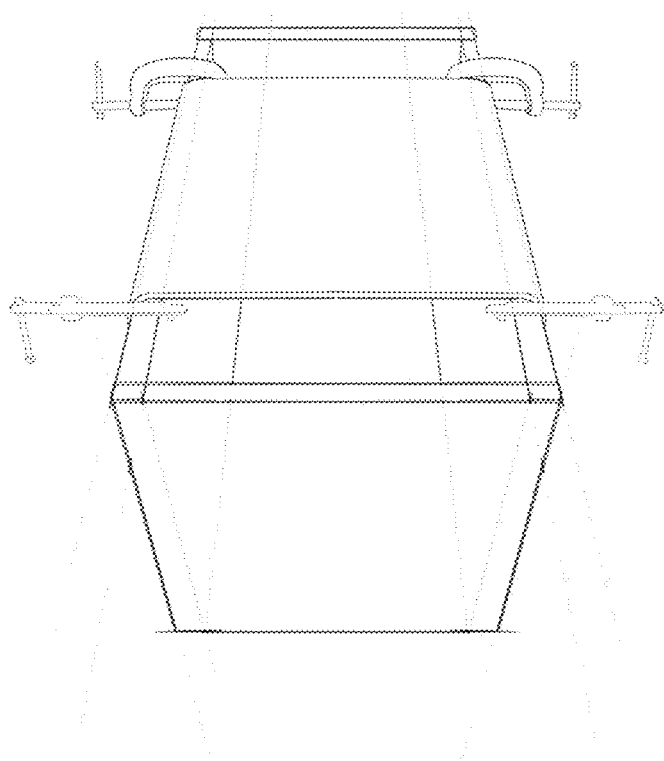
FIG. 15 is a depiction of the "corner test" as further set forth in the specification.
Figure 16:
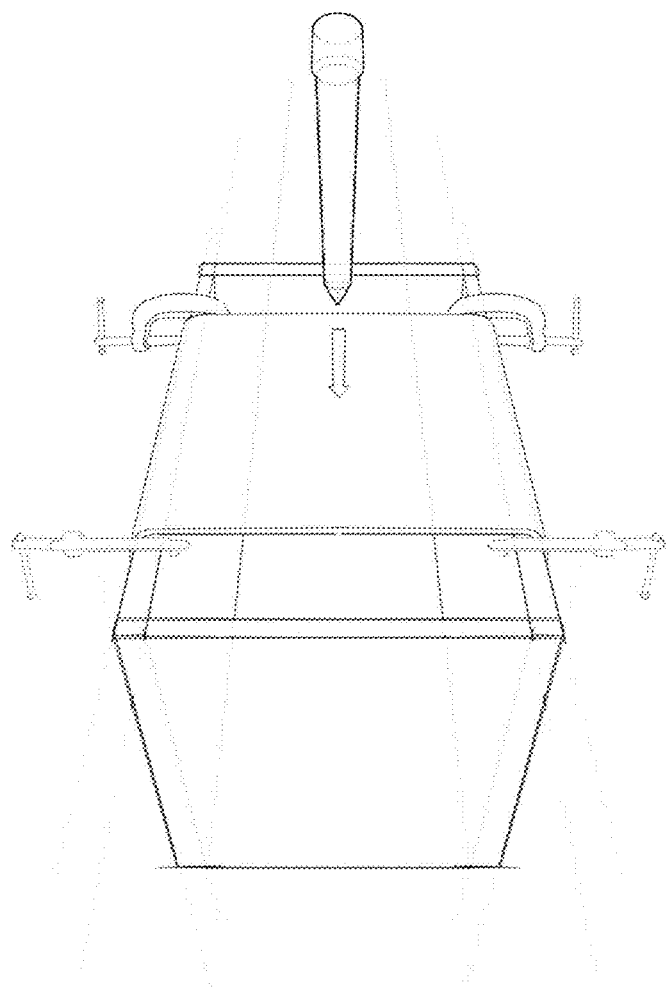
FIG. 16 is a depiction of the "corner test" as further set forth in the specification.
Figure 17:
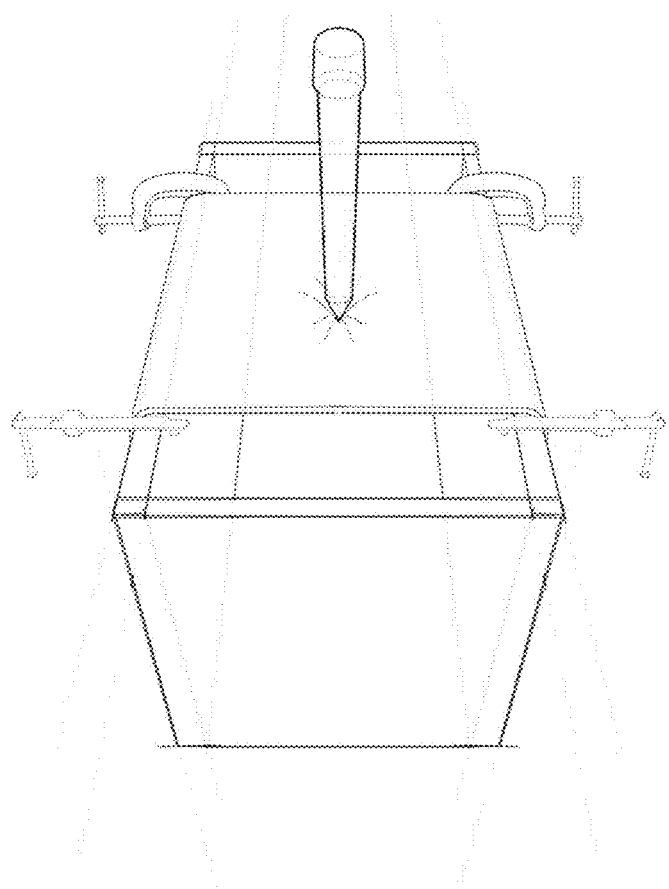
FIG. 17 is a depiction of the "corner test" as further set forth in the specification.
Figure 18:
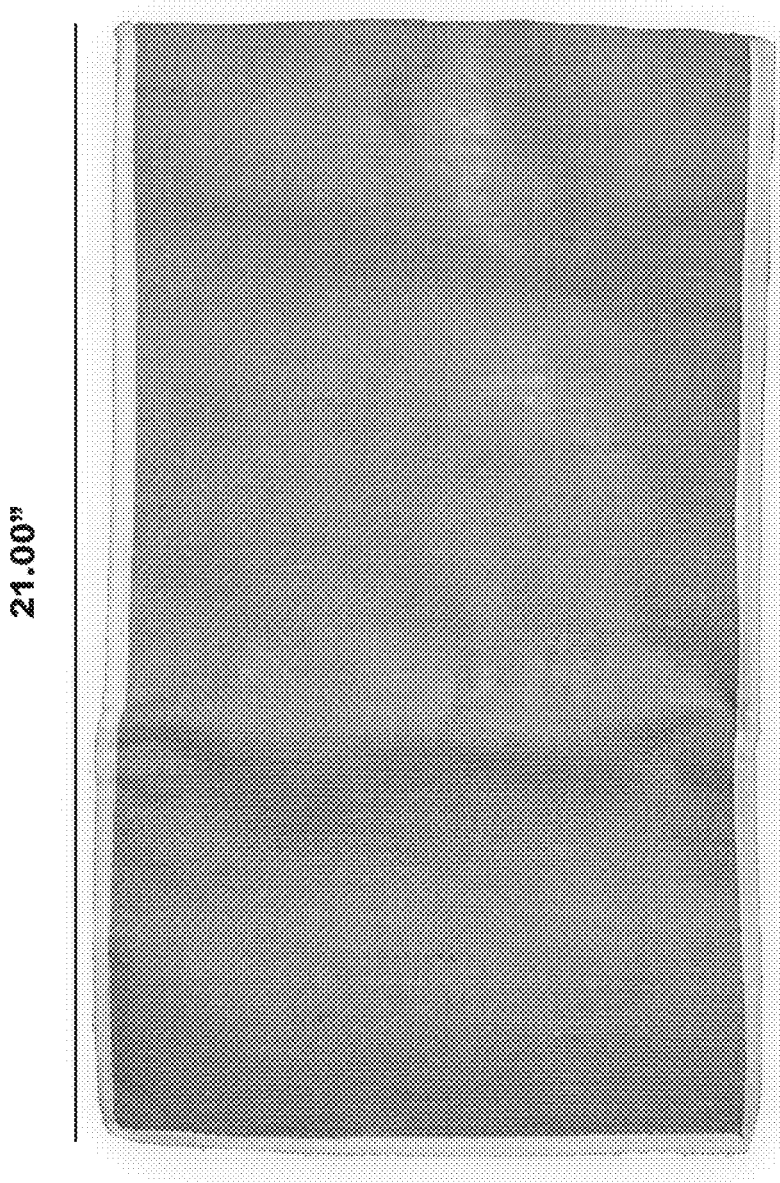
FIG. 18 is a depiction of a 12.25"×21" rectangular piece of jute
Figure 19:
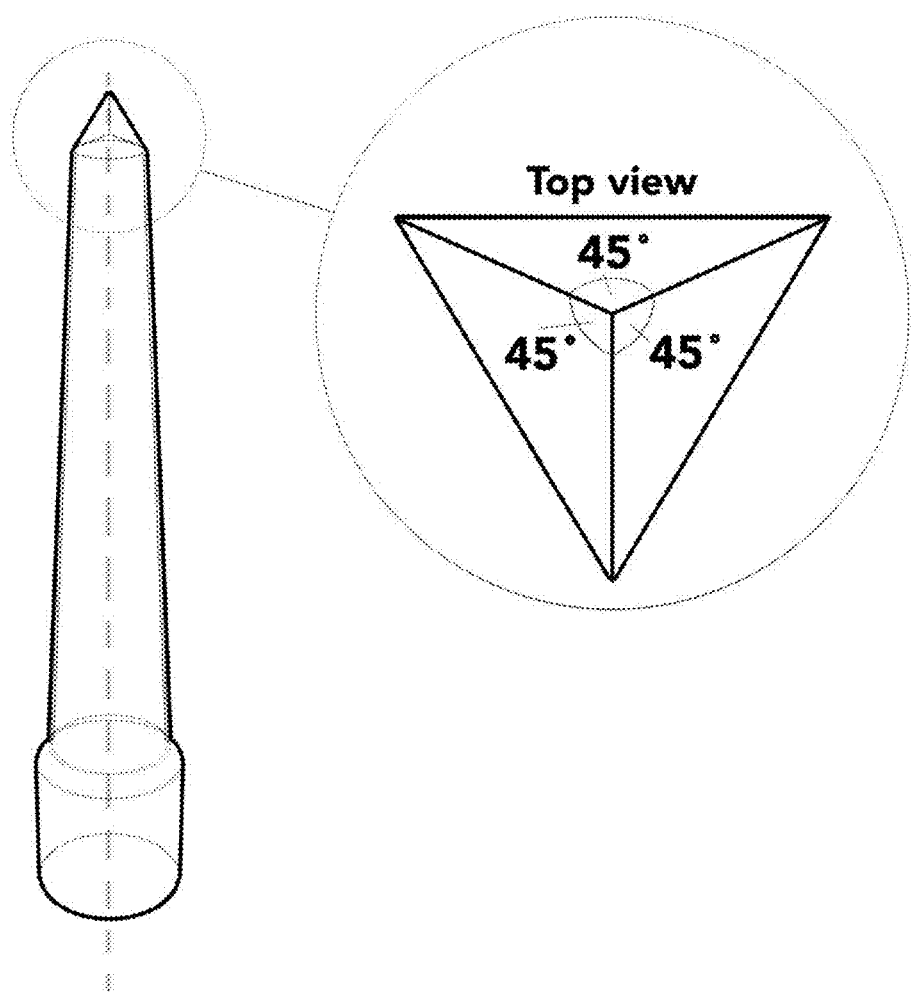
FIG. 19 is a depiction of a punch with a tetrahedron shape at one end

The inner layers can be made of any thin, flexible material, including, but not limited to; mylar, polyethylene based plastics, pulp based fibers, aluminum foil, metallized Polyethylene terephthalate (PET), rubber, or latex, that may be sealed to form an airtight but flexible chamber. Some of these materials may be more puncture proof than the others. Regardless of material, the inner layers may also be coated in a polyurethane based compound to provide increased puncture resistance. In a preferred embodiment, the material will be mylar. A 200 gauge (0.002") mylar layer specifically has a puncture resistance of around 12 lbf (pound force, 1 lbf 4.448222 N)—however it can range from 10 lbf-22 lbf. Layers of between 100 and 300 gauge mylar may be sufficient for some applications. In other applications, the puncture resistance of the inner layer has to be more than 22 lbf., In order to determine whether the material is sufficiently puncture resistant so as to resist puncture by corners, the following test, as depictured in FIGS. 15-19, may be performed. An exemplary embodiment is explained in further detail as follows:
1) Placing a 12.25"×21" rectangular piece of jute (FIG. 18) (reinforced on the edges with fabric) pulled taught and centered over two vertical wooden boards spaced 12" apart (outside edge to outside edge). See FIG. 15.
2) Where the jute is pulled such that the ends of the piece of jute around the edges and clamp to the sides of each board. See FIG. 15 where there is one clamp placed at each corner of the piece of jute.
3) Thereafter, using a punch with a tetrahedron shape at one end, with the corners of the point meeting at 45 degree angles (to mimic the corner of a rectangular box). FIG. 19.
4) Pressing the punch into the center of the taut piece of jute with its center axis directly vertical or perpendicular to the flat piece of jute. FIG. 16, 17.
5) Measuring the force (in pounds) for the punch to puncture the jute, where, in one embodiment, puncture occurred between 18-22 pounds of pressure.
6) In alternative embodiments, puncture occurs between 10 and 25 pounds of pressure.
7) In yet another embodiment, puncture occurs at at least 10 lbf.

Figure 20:
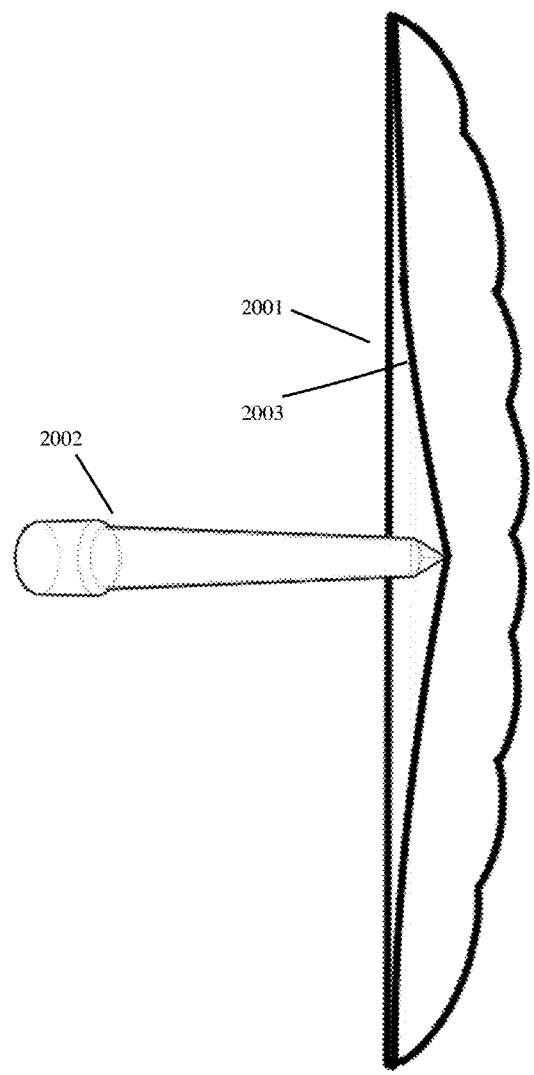
FIG. 20 is a depiction of one embodiment where the mylar inner wall puncture test is applied as further set forth in the specification

In yet another embodiment, the following test, as depicted in FIG. 20 is performed:
1) A 12.25"×21" rectangular piece of jute (reinforced on the edges with fabric) and a 12.25"×21" rectangular piece of mylar are aligned directly on top of each other and pulled taught and centered over two vertical wooden boards spaced 12" apart (outside edge to outside edge).
2) The ends of the pieces of jute and mylar are pulled around the edges and clamped to the sides of each board, where one clamp is placed at each corner of the piece of jute and mylar.
3) Using a punch with a tetrahedron shape at one end, with the corners of the point meeting at 45 degree angles, the punch is pressed into the center of the taut piece of jute and mylar (the punch hit the jute first then the mylar) with its center axis directly vertical or perpendicular to the flat piece of jute.
4) Measure the force (in pounds) it takes for the punch to puncture the jute AND mylar.
5) In said embodiment, the puncture occurred between 25-40 pounds of pressure.
6) In alternative embodiments, the puncture occurs at at least 25 pounds of pressure.

Figure 21:
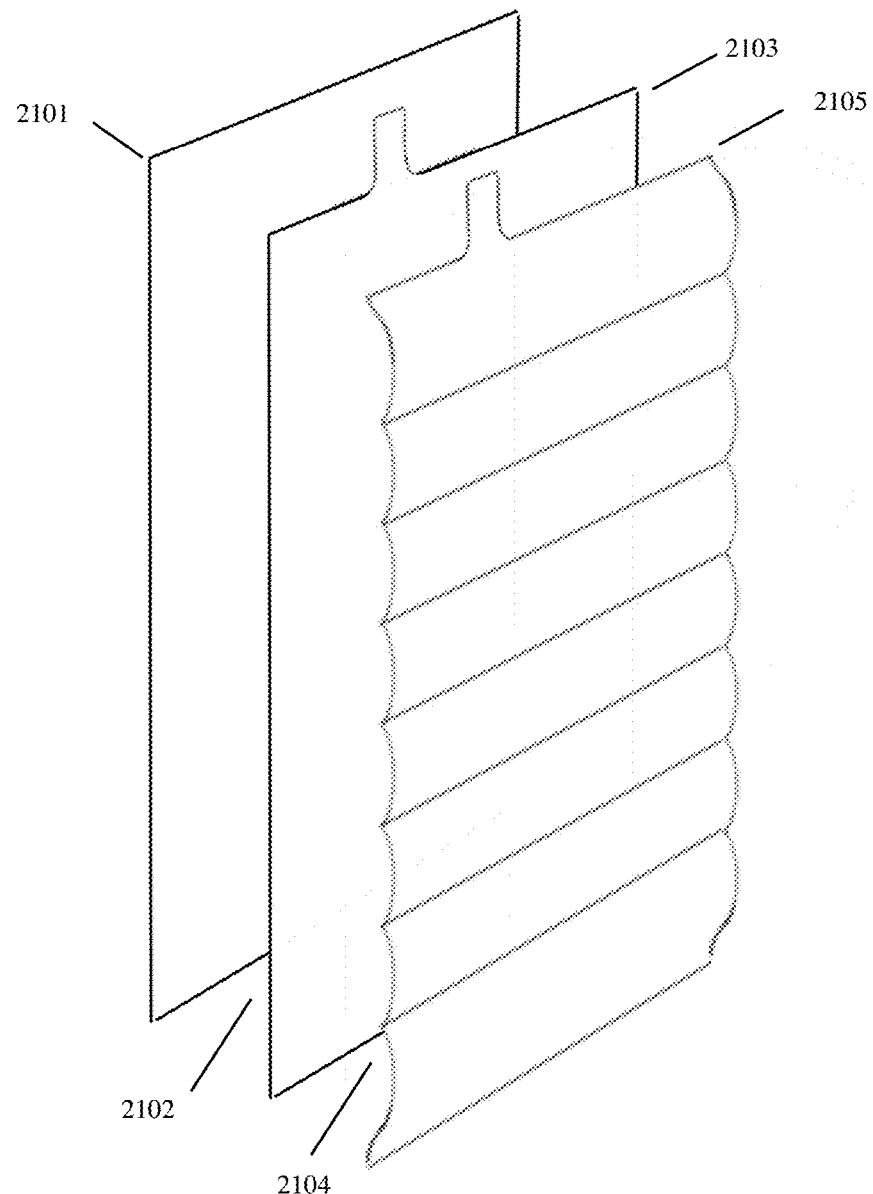
FIG. 21 is a depiction of material and layering options for the wall section and inflatable bladder wall section of the invention

The reason the puncture resistance is high is that there is airspace between the mylar and the jute, and the mylar has some give to it (see FIGS. 20, 21). For instance, in FIG. 21, where 2101 is the textile separated or proximate at normal air pressure (2102). The first flexible layer (2103) is then separated by pressurized air (2104) when inflated in a second state with a second flexible layer (2105). When the punch (2002) punctures the jute (2001), it then pushes the mylar wall (2003) another inch or so before it punctures the mylar (see FIG. 20.).

Figure 2:
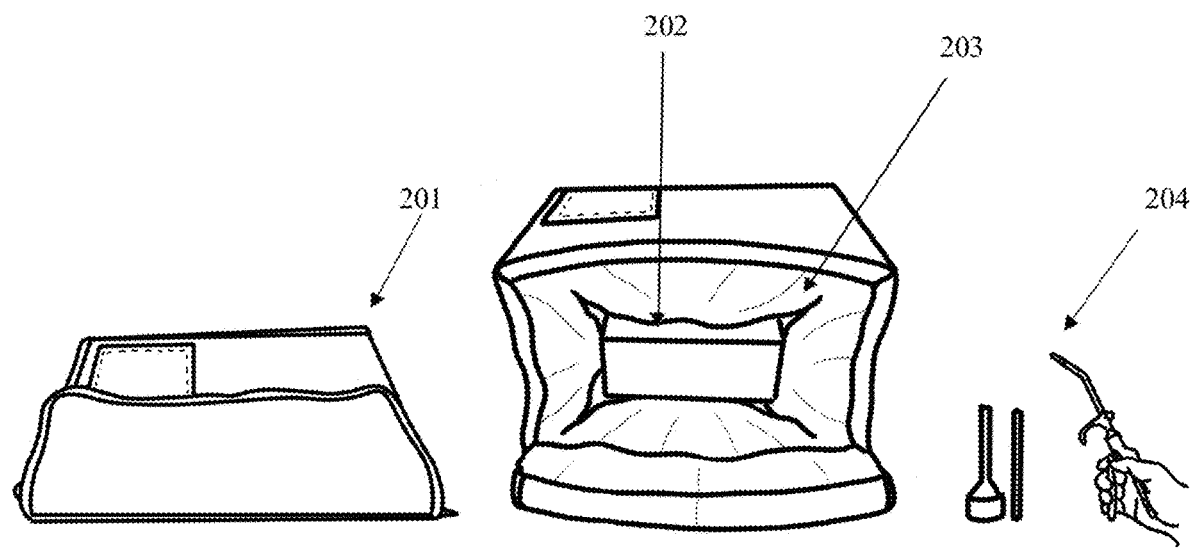
FIG. 2 depicts the claimed invention in its relaxed state, and in its inflated state as shown next to the air pump used to inflate
Figure 3:
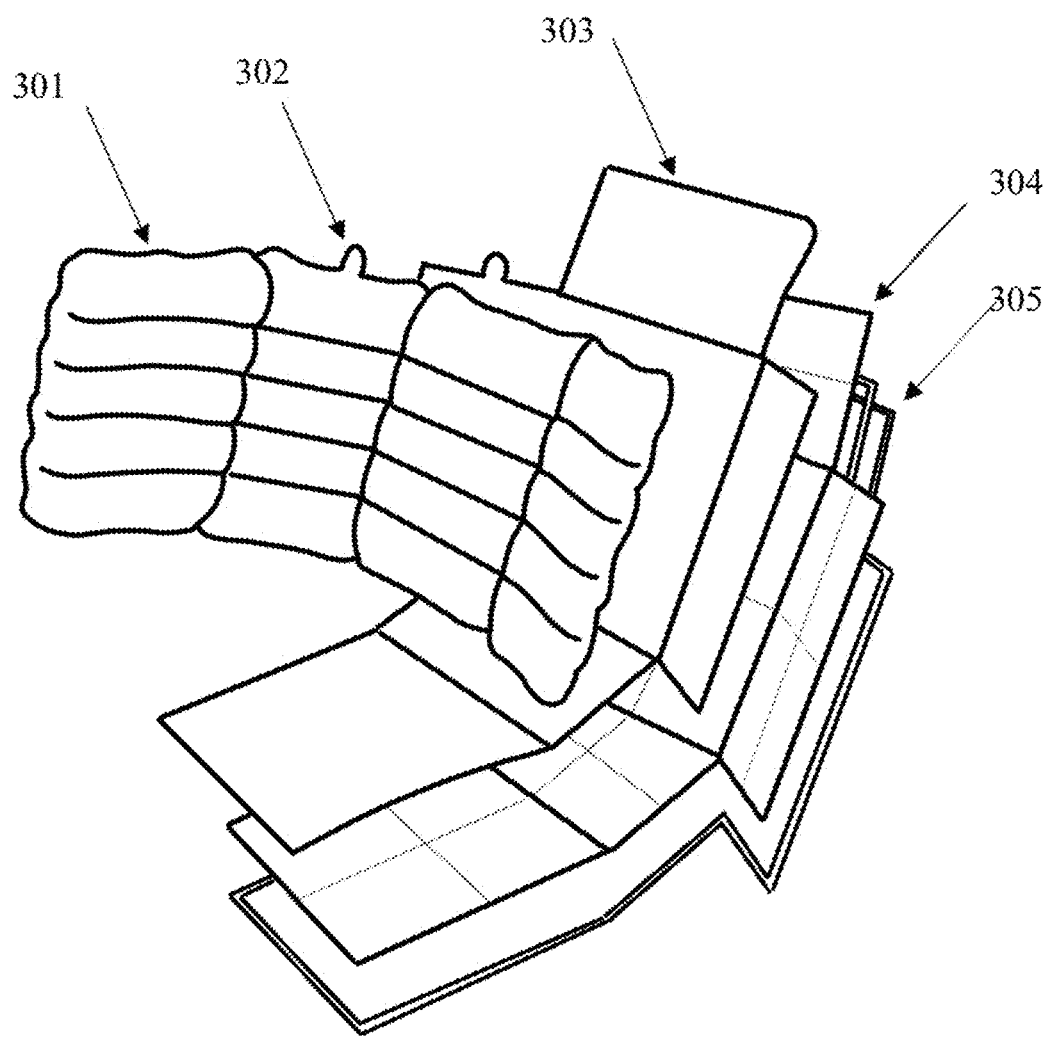
FIG. 3 is an exploded view of the packaging system

The vessel is an air-tight compartment that is formed of a flexible material such that when deflated, it occupies little volume (201), but when fully inflated occupies substantially all of the interior region of the packaging device. See FIG. 2, 203. This makes it possible to have a one-size fits all device, in that a payload (202) that is smaller than the interior region of the packaging device is inserted into the interior (FIG. 2, 202) and is protected by inflating the vessel using an air pump (204) until the payload is secure—whatever its size. Alternatively, the vessel may be designed so in the inflated state it occupies a predetermined portion of the interior region of the rhomboid outer layer. This may be appropriate for packaging where the payload size is already known. For example, the vessel may be designed to fill one eight of the volume of the interior region when inflated without a payload.

Figure 9:
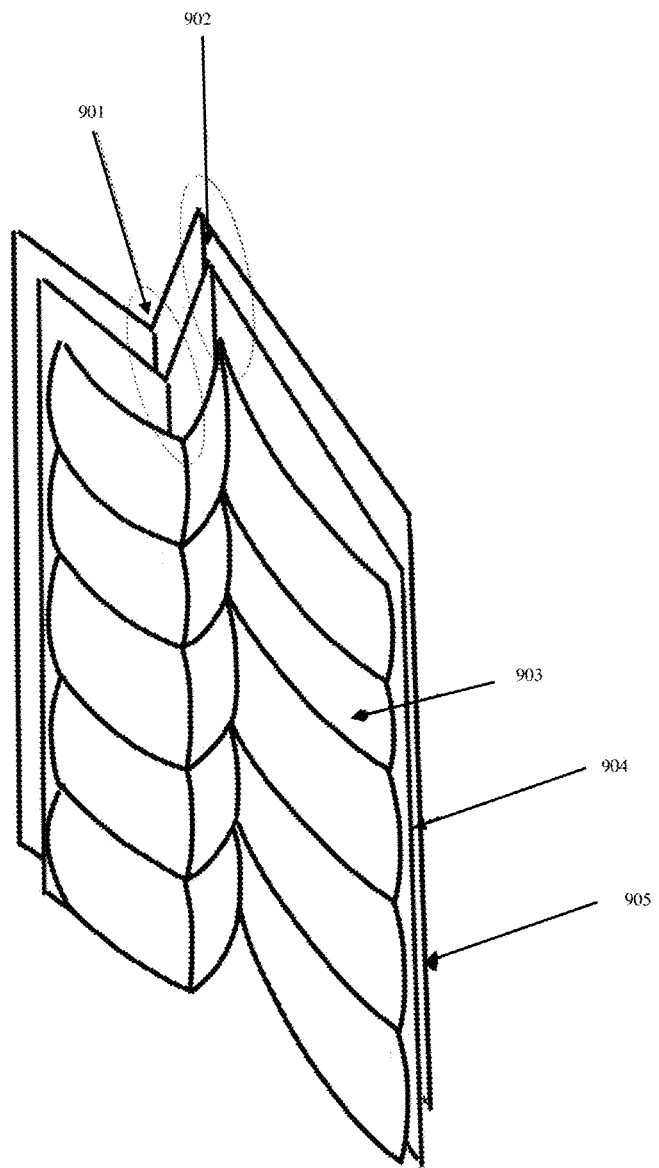
FIG. 9 is a model of the claimed invention depicting two heat sealed layers with ribbing and the outer layer.

In the preferred embodiment, the vessel is comprised of ribs along the interior surface of the outer bladder layer (903) and along the inner bladder layer (904) in order to prevent the walls of the outer protective layer (905) from being appreciably deformed or rounded when the vessel is inflated. Further, the vessel is capable of being folded along the crease in (901) and the crease out (902). See FIG. 9.

The ribbed vessels may be comprised of textile enforced plastic, or mylar, however, the former permits a higher pressure load. In the preferred embodiment, the vessel is formed of two layers of mylar. The two inner layers that form the vessel are made of Mylar film—which is a high tensile strength plastic that forms a gas tight and odor barrier. Multiple sheets of Mylar may be melted and sealed together under high temperatures, referred to herein as heat sealing. A heat susceptible plastic layer may be used such that heat sealing or heat forming of ribs or creases may be accomplished. In addition, the vessel may be further comprised of a textile later that covers at least the interior layer of the plastic in order that the package payload not directly chafe or puncture the plastic layer forming the vessel itself. This textile layer may be of a sufficient strength to be resistant to corner punctures or needle punctures. See FIG. 20.

The vessel is made as one inflatable component, rectangular in overall shape, the width of which is the height of the rhomboid and the length of which is the perimeter of the top or bottom side of the rhomboid. The vessel is comprised of ribs that, when fitted into the box, are parallel to the plane of the lid and floor. The vessel is further formed with depressions running along the widths are points such that when fitted into the box, the depressions are situated at the corners of the box, occupying the region along the four vertical corners of the rhomboid.

Figure 11A:
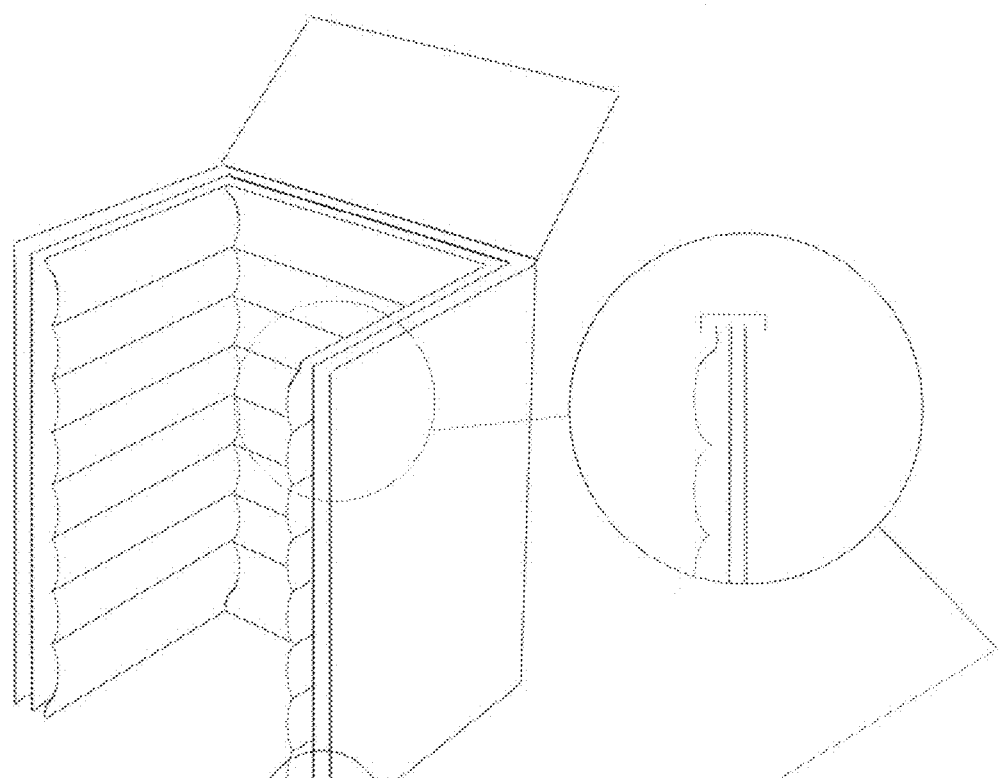
FIG. 11 is a model of the claimed invention (FIG. 11A) depicting the layers (FIG. 11B) that are heat sealed (FIG. 11C) and sewn (FIG. 11D)
Figures 11B, 11C, 11D:
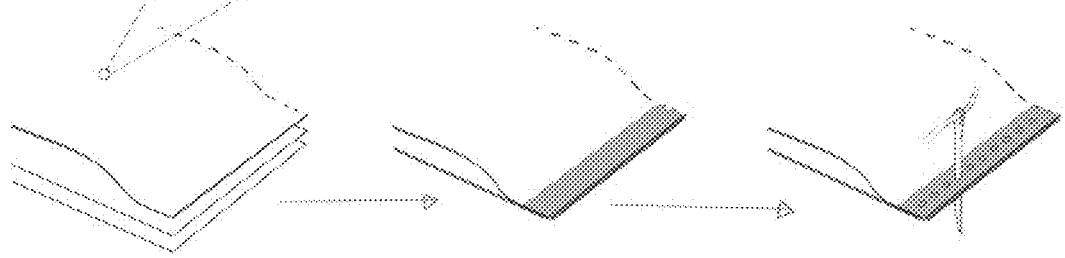

The two layers of mylar that form the vessel are heat sealed around the edges. Within that heat seal, the vessel is then sewn into the outer textile layer forming the outer layer. See FIG. 11. The heat seal forming the vessel is along the perimeter of the top and bottom and sewn along those perimeters to the outer layer.

The ribs are formed by using the heat sealing device to sufficiently heat the mylar so as to distort it along the desired orientation of the rib line but not to actually seal the two layers of mylar on either side. The result is a defined crease in the interior layer, referred to as the rib. Creases in the vessel are also formed along the line that forms the vertical corners of the rhomboids. There are pre-defined lines that form three vertical corners where heat is applied on both the exterior side of the vessel and interior of the vessel in order that the corner be well defined, but the interior and exterior layers are preferably not sealed together.

In one embodiment of the invention, the vessel is formed from two rectangular sheets of mylar. The vessel thus formed is attached to be proximate to the four sides of the rhomboid. In other embodiments, the two sheets of mylar are "T" shaped. Additional corner creases are applied such that one arm of the "T" can be placed proximate to the bottom of the rhomboid and the other arm proximate to the top or lid of the rhomboid. The creases are formed where the edge of the bottom meets one of the sides of the rhomboid and where the edge of the top meets the side of the rhomboid. In this embodiment, the vessel can be inflated so as to push against the payload in 6 directions.

The vessel is further comprised of a valve that can selectably be used to inflate or deflate the vessel. In another embodiment, the valve for the inner vessel unit is incorporated into the invention by way of an inflatable valve technology using mylar components cut or shaped out of the mylar sheets or a separate valve system (1001). The valve is comprised of a mechanism attachment into which a pressurizing device may be connected, for example an air pump. Further, the valve can be operated so as the pressure in the vessel is released in order that it be deflated. In one embodiment, the valve is comprised of the mylar layers comprising the vessel itself. See FIG. 10, (1002). For example, the mylar layers may be shaped so that upon heat sealing of the two layers, a valve stem is created (1002). Further, the mylar may be folded internally to the stem region in order to form a valve, such that when pressure is created on the interior of the vessel, the pressure forces a flap of mylar within the valve stem to remain closed (1003). Further, the flap is movable by means of a foreign object inserted into the valve stem in order to move its position and deflate the vessel. In this way, the valve itself is fully integrated with the vessel (302)—the two layers with some added technology form the valve. By being integrated using the mylar layer, the valve stem and valve folds flat when not in use, whether the package is in the folded state or the inflated state with the lid or top closed. The valve itself is comprised of two halves, where each half comprises its respective half of the entire inner (1002). The interior walls of the vessel and interior half of the valve all comprise one sheet (301). The exterior walls of the vessel and exterior half of the valve will all comprise one sheet. See FIG. 3, 302, 303, 304, 305. In this latter embodiment, the two mylar layers forming the vessel will have a stem potion that when heat-sealed together comprise the valve (302).

In alternative embodiments, the valve may be comprised of valve stems typically used for inflating bicycle wheel inner-tubes, a Boston valve, a silicone medical resuscitator intake umbrella valve, a silicon respirator valve, or a rubber ball inflation valve—any of which may be attached to the vessel via heat sealing, welding or adhesives at the base or the brim of any of the aforementioned types of valves. The attached valves operate by permitting air-flow into the vessel when the air pressure outside of the valve is greater than the air pressure in the vessel, while blocking air-flow when the vessel air pressure is greater than on the outside of the valve. In this embodiment, an external pump may be used to inflate the vessel by attaching it with a corresponding air-tight attachment to the valve. In other valve configurations, the valve prevents air flow in either direction, but permits a hollow needle to be inserted into the valve material in order to introduce air under pressure.

Figure 22:
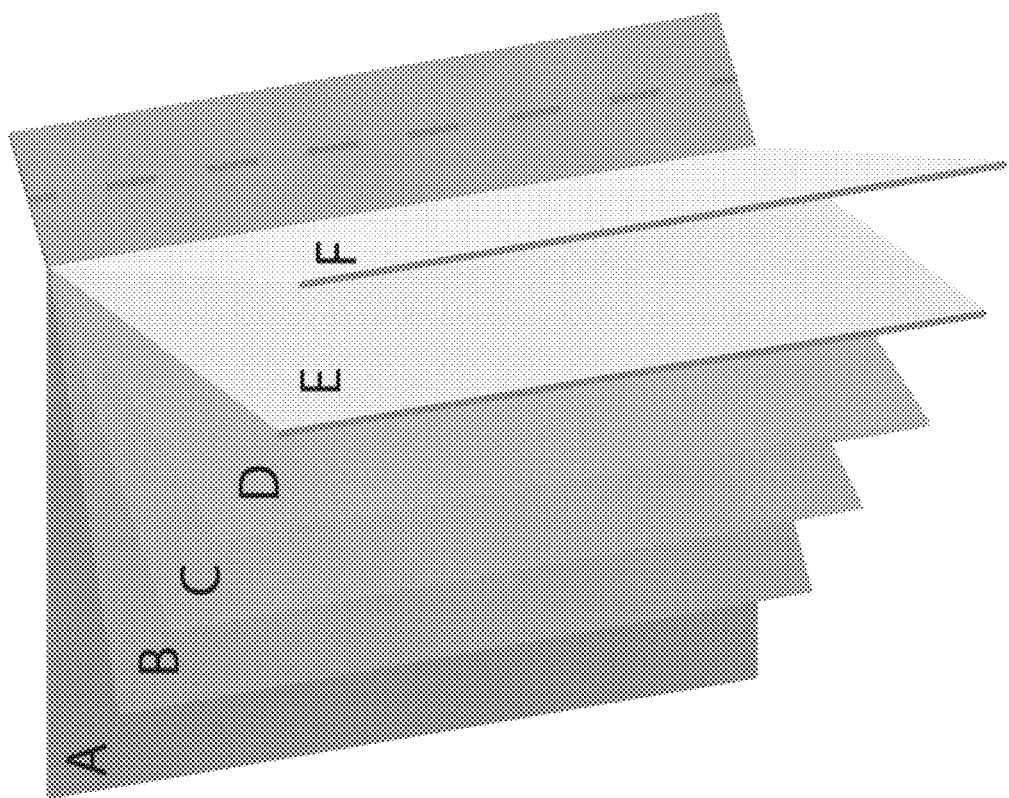
FIG. 22 is a a depiction of material and layering options for the wall section and inflatable bladder wall section of the invention

In an alternative embodiment, the materials for the outer walls of the box and for the air bladders may be comprised of a variety of materials. By way of example and not limitation, the inflatable air bladder wall may be comprised of any of: (a) thermoplastics/polyseters; (b) Polyethylene terephthalate; (c) Polyethylene or Polythene; (d) Ethylene Vinyl Alcohol; (e) Polyamide nylon; (f) MET-PET (Materialized PET); (g) Polypropylene; (h) Elasticine; metal foils such as aluminum or mylar, or combinations such as MET-PET (Metalized PET). FIG. 23. By way of example and not limitation, the outer protective wall material may be comprised of any of: (a) jute; (b) cotton; (c) linen; (d) hemp; (e) silk; (f) flax; (g) Ramie; (h) Manila; etc. Each wall may consist of one to five layers, where each layer may be comprised of a different material and different thickness. In a preferred embodiment, shown in FIG. 22, A and F are the outer protective walls comprised of any of the materials listed above. In one embodiment, where the wall thickness of wall A is 1 mm, the outer layer may be comprised of 0.2 mm layer made of Jute, a 0.8 mm middle layer comprised of cotton, and a 0.2 mm inner layer comprised of nylon. Similarly, walls B, C, D, E may be comprised using the materials recited above for inflatable vessel bladder wall materials.

In yet another embodiment, the lid of the vessel is a sealed rectangular vessel such that the bottom of the rectangle is connected to the other air bladders on the other five sides of the box and the top of the air bladder on the lid is open and extended (FIG. 23A, FIG. 23B). In this embodiment, the inflatable bladder may be tightly rolled (FIG. 23B) and attached to tabs (FIG. 23C) and secured by either Velcro™ (FIG. 23D) or snaps (FIG. 23E) where the snap mechanism is on the tab as well as roll up location on the main part of the vessel (FIG. 24). In order to seal off the open end and maintain pressure in the inflatable vessel, the user will grab the two tabs on either side, roll the extended portion multiple times over itself, then fold in the two tabs, and secure the two tabs via the methods shown (FIG. 24). There are multiple methods for securing the straps or tabs. They can be elongated where the length of the tab is approximately half the distance across the entire top side and both ends of the tabs have mating mechanisms, for example a buckle (FIG. 24C, FIG. 24D) or they can be similarly attached along the surface where the tabs fold over, using mating Velcro™ strips adhered to the surface of the tab and the attachment location on the interior surface of the inflatable vessel, or mating snaps attached to the surface of the tabs and the interior surface of the inflatable vessel. (FIG. 24A, FIG. 24B) Fixing the tabs prevents the roll from unravelling and thereby maintains the air pressure.

Figure 4:
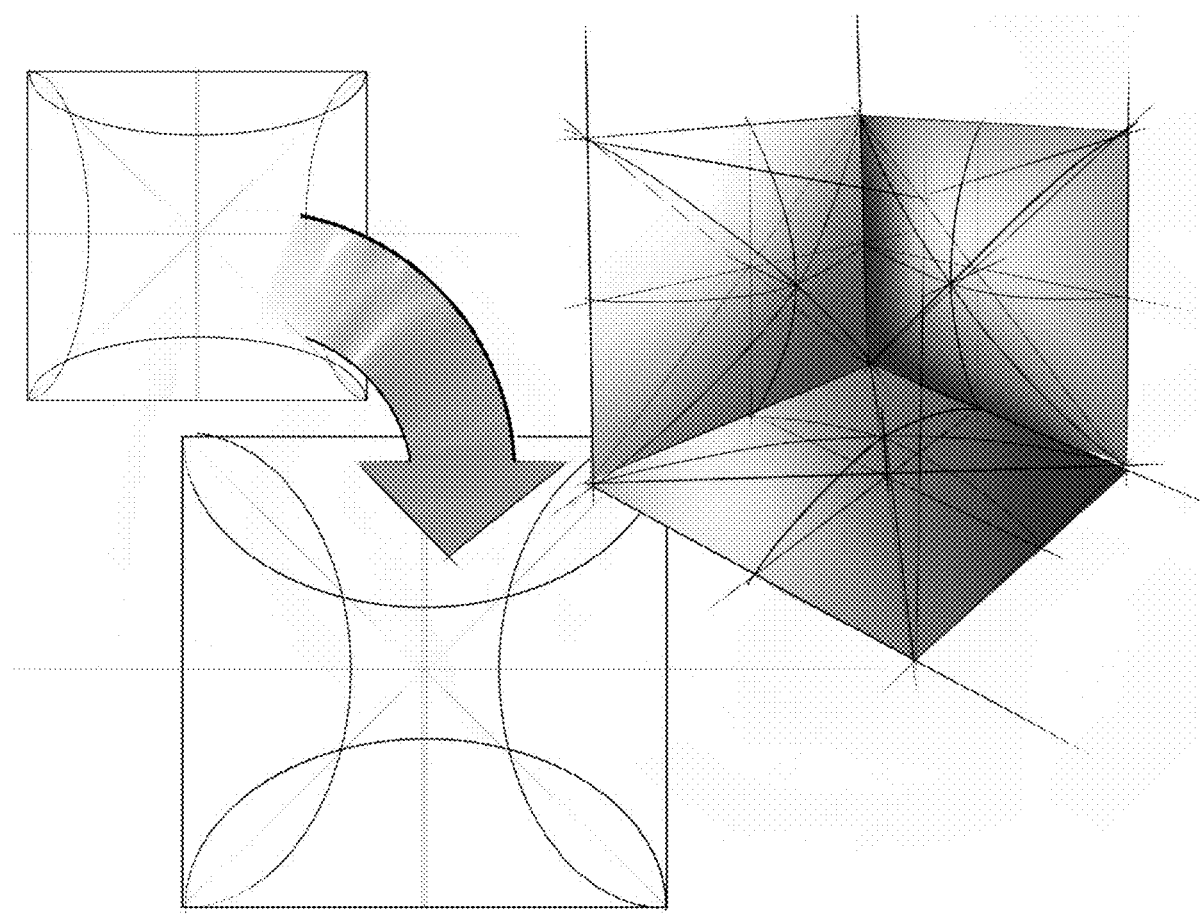
FIG. 4 depicts the claimed invention in a second embodiment

In an alternative embodiment, the vessel may be attached at vertical corners using an adhesive. Further, an adhesive may bond the vessel to the outer layer. The vessel is then configured so that as it inflates, each portion of the vessel corresponding to each side of the rhomboid expands primarily at the center, so as to form, in cross section, an arc, where the maximum point of expansion is at the center of the polygon formed by the corresponding side of the rhomboid. See FIG. 4.

In yet another alternative, instead of one contiguous vessel comprising the package, there may be more than one vessel within the package, each inflated individually. In another embodiment, each panel comprising the sides, top and bottom of the rhomboid may have a vessel attached to it that has its own valve, the vessels being configured such that when fully inflated together, the vessels together occupy substantially all of the interior of the rhomboid.

In yet another embodiment, the package in its deflated state may be stored flat in such a way that the floor of the rhomboid (701) remains flat and unfolded (702). As shown in FIG. 7, there is a crease parallel to the bottom of the rhomboid (703) along the front face. In addition, the two sides adjacent to the front face each have a vertical crease (704, 705) in the middle that runs from the top to part way down the sides. At about the height of the crease on the front above the floor of the rhomboid, the crease running along the middle splits into two creases (706, 707) that run diagonally to the vertices at the bottom of the two sides where the two sides meet the floor (708, 709, 710, 711). When in the deflated state, the rhomboid may be laid flat with the floor of the rhomboid folded up, the top of the rhomboid (712) folded over and the sides of the rhomboid folded within themselves. (713, 714).

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. An inflatable packaging device that is adapted in a first state to be folded in a substantially flat configuration and in a second state, to be expanded and inflated to enclose and protect an article, said inflatable packaging device comprising:
    an outer layer comprised of an outer layer material that in the second state forms a rhomboid comprised of at least six sides each of six sides comprised of a perimeter comprised of four edges, said six sides comprised of a bottom side and a top side, where each of the four edges of the bottom side are permanently attached to a corresponding one edge of four other sides, each of the four other sides, are permanently attached to two neighboring other sides along their common edge, and said top side attached to one of the other sides along one edge of the top side and said rhomboid thereby enclosing an interior region when in the second state, and at least two of the four other sides each having an axis in its respective plane around which said at least two other sides are foldable when the outer layer is transformed into in the first state;
    an inflatable vessel comprised of at least one inner layer material, said inflatable vessel situated within the interior region and placed in proximity to at least one of the four sides of the rhomboid formed by the outer layer when in the second state, said inflatable vessel expandable in said second state so as to occupy an substantial volume of the interior region when the inflatable vessel is inflated without a payload, and without appreciably deforming the rhomboid shape formed by the outer layer when in the second state;
    a valve attached to the inflatable vessel, said valve operable to selectively admit air into the inflatable vessel when under pressure in order to expand the inflatable packaging device into the second state or release air from the inflatable vessel in order to compact the outer layer and the inflatable vessel comprising the inflatable packaging device together into the substantially flat configuration of said first state.

2. The inflatable packaging device of claim 1 where in the second state, the inflatable vessel occupies at least one eighth of the volume of the interior region of the rhomboid.

3. The inflatable packaging device of claim 2 where the inflatable vessel is further comprised of an inflatable section that is proximate to the top side of the rhomboid in the second state.

4. The inflatable packaging device of claim 1 where the at least one inner layer material of the inflatable vessel is comprised of a flexible membrane layer comprised of plastic.

5. The inflatable packaging device of claim 4 where the flexible membrane layer is further covered in a textile material layer.

6. The inflatable packaging device of claim 1 where the at least one inner layer material of the inflatable vessel is reinforced with a material comprised of a textile.

7. The inflatable packaging device of claim 1 where the at least one inner layer material of the inflatable vessel is comprised of one of: mylar or metallized Polyethylene terephthalate (PET).

8. The inflatable packaging device of claim 1 where the inflatable vessel is comprised of an at least one ribs that retard the amount of expansion proximate to said at least one ribs in order that the inflatable vessel does not appreciably distort the rhomboid shape in the second state.

9. The inflatable packaging device of claim 1 where the inflatable vessel is comprised of an at least one corner edge depressions that are situated along an at least one corresponding corner edges of the rhomboid in the second state, said at least one corner edge depressions occupying the region along the four vertical corners of the rhomboid that retard the amount of expansion proximate to said at least one corner edges in order that the maximum dimension of expansion of the inflatable vessel into the interior region in the second state is primarily along the center line between two of said at least one corner edge depressions.

10. The inflatable packaging device of claim 1 where the outer layer material is comprised of jute.

11. The inflatable packaging device of claim 1 further comprising an insulating layer between the outer layer material and the inflatable vessel.

12. The inflatable packaging device of claim 11 where the insulating layer is comprised of one of: a metallic coated plastic, metallic foil.

13. The inflatable packaging device of claim 12 where the metallic coated plastic is one of: mylar or metallized Polyethylene terephthalate (PET).

14. The inflatable packaging device of claim 1 where the inflatable packaging device is configurable from the second state back into the first state, by deflating the inflatable vessel, folding the bottom side of the rhomboid onto itself with at least a single bifold, folding the at least two sides of the rhomboid onto themselves with at least a single bifold and folding the top side of the rhomboid along a seam between the top side and one of the at least two sides over one of the at least two sides in order that the inflatable packaging device is substantially flat.

15. The inflatable packaging device of claim 1 where the inflatable vessel is comprised of one of: mylar or metallized Polyethylene terephthalate (PET).

16. The inflatable packaging device of claim 15 where the inflatable vessel is comprised of a first and a second sheets of a flexible material, each of the first and second sheets having an at least one edge, said first and second sheets heat sealed to each other along the at least one edges.

17. The inflatable packaging device of claim 1 where the inflatable vessel is comprised of a heat-susceptible plastic and further comprised of an at least one heat-formed rib crease placed on an interior surface of the inflatable vessel oriented in a plane parallel to the bottom side of the rhomboid in the second state.

18. The inflatable packaging device of claim 1 where the inflatable vessel is formed of a heat-susceptible plastic and further comprised of an at least one heat-formed crease running on a corresponding at least one interior corner edge of the inflatable vessel and a corresponding at least one exterior corner edge of the inflatable vessel.

19. The inflatable packaging device of claim 1 where the valve is comprised of the material comprising the inflatable vessel.

20. The inflatable packaging device of claim 1 where the inflatable vessel is attached to the outer layer material by a seam sewn through a first and a second sheets of mylar that are heat sealed together along the perimeter edge of either the top side or the bottom side of the outer layer.

21. The inflatable packaging device of claim 1 where the outer layer material has a stiffness of between around 33% to around 73%.

22. The packaging device of claim 1 where the inflatable vessel is comprised of at least one inner layer material that is comprised of between 100 and 300 gauge mylar.

23. The inflatable packaging device of claim 1 where the inflatable vessel is comprised of at least one inner layer material that has a needle puncture resistance of between 2 and 10 Newtons to a puncture test using a 25 gauge needle penetrating perpendicular to the material.

24. The inflatable packaging device of claim 1 where the inflatable vessel is comprised of at least one inner layer material that has a corner puncture resistance of between 10 lbf-22 lbf.

25. The inflatable packaging device of claim 1 where the outer layer material has a corner puncture resistance of between 18 to 22 pounds.

26. The inflatable packaging device of claim 1 where the outer layer material has a corner puncture resistance of between 10 to 25 pounds.

27. The inflatable packaging device of claim 1 where the outer layer material in combination with the an at least one inner layer material has a corner puncture resistance of between 25 and 40 pounds.

28. The inflatable packaging device of claim 1 where the stiffness of the outer layer material is equal to or greater than 73%.

29. The inflatable packaging device of claim 1 where the outer layer material has a corner puncture resistance equal to or greater than 10 lbf.

30. The inflatable packaging device of claim 1 where the outer layer material in combination with the an at least one inner layer material has a corner puncture resistance equal to or greater than 25 lbf.

31. The inflatable packaging device of claim 1 where the at least one inner layer material has a corner puncture resistance equal to or greater than 22 lbf.

32. The inflatable packaging device of claim 1 where the inner inflatable vessel is coated in a textile fabric.

33. The inflatable packaging device of claim 1 where the inflatable vessel is comprised of at least one inner layer that is proximate to at least one side of the outer layer and is attached to said at least one side of the outer layer only along at least part of the perimeter of the corresponding at least one side of the outer layer.

34. The inflatable packaging device of claim 1 where the inflatable packaging device is configurable from the second state back into the first state, by deflating the inflatable vessel, folding the front side of the rhomboid onto itself with at least a single bifold, folding the at least two sides of the rhomboid onto themselves and folding the top side of the rhomboid over the folded front side in order that the inflatable packaging device is substantially flat and the bottom side is not folded.

35. The inflatable packaging device of claim 1 where the valve is attached to the inflatable vessel by one of a heat sealing, welding or an adhesive.

36. The inflatable packaging device of claim 35 where the valve is comprised of one of a Boston valve, an umbrella valve, a respirator valve, a rubber ball inflation valve.

37. The inflatable packaging device of claim 1 where the inflatable vessel is made from one of: (a) thermoplastics/polyseters; (b) Polyethylene terephthalate; (c) Polyethylene or Polythene; (d) Ethylene Vinyl Alcohol; (e) Polyamide nylon; (f) MET-PET (Materialized PET); (g) Polypropylene; (h) Elasticine; metal foils such as aluminum or mylar, or combinations such as MET-PET (Metalized PET).

38. The inflatable packaging device of claim 1 where the outer layer is made from one of: (a) jute; (b) cotton; (c) linen; (d) hemp; (e) silk; (f) flax; (g) Ramie; (h) Manila.

39. The inflatable packaging device of claim 1 further comprising a top inflatable vessel side proximate to the top side is comprised of a first tab and a second tab, the first and second tabs protruding proud of a corresponding first and second edges of the top side and the top inflatable vessel side is configured to be partially rolled up when under pressure and further configured so the at the first and second tabs may be folded over and either fastened to the interior surface of the top inflatable side at a corresponding first and second fasteners or fastened to each other using a corresponding first and second end fasteners.

40. The inflatable packaging device of claim 39 where the first and second fasteners are one of: a first and second Velcro™ strip, or a first and second snap.

41. The inflatable packaging device of claim 39 where the first and second end fasteners are a corresponding mating mechanism.

* * * * *